(12) United States Patent
Agarwal et al.

(10) Patent No.: US 11,482,000 B2
(45) Date of Patent: Oct. 25, 2022

(54) IMAGE PROCESSING APPARATUS AND CONTROL METHOD THEREOF

(71) Applicant: SAMSUNG ELECTRONICS CO., LTD., Suwon-si (KR)

(72) Inventors: Vivek Agarwal, Suwon-si (KR); Anant Baijal, Suwon-si (KR); Dae Eun Hyun, Suwon-si (KR); Mi Jeong Kwon, Suwon-si (KR); Yun Joo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 16/688,265

(22) Filed: Nov. 19, 2019

(65) Prior Publication Data

US 2020/0160056 A1    May 21, 2020

(30) Foreign Application Priority Data

Nov. 21, 2018   (KR) .......................... 10-2018-0144332

(51) Int. Cl.
| | | |
|---|---|---|
| *G06K 9/00* | (2022.01) | |
| *G06V 20/20* | (2022.01) | |
| *G06T 7/11* | (2017.01) | |
| *G06T 7/168* | (2017.01) | |
| *G06V 10/42* | (2022.01) | |

(52) U.S. Cl.
CPC ............... *G06V 20/20* (2022.01); *G06T 7/11* (2017.01); *G06T 7/168* (2017.01); *G06V 10/42* (2022.01); *G06T 2207/20081* (2013.01); *G06T 2207/20084* (2013.01)

(58) Field of Classification Search
CPC . G06T 2207/20081; G06T 2207/20084; G06T 7/11; G06T 7/168; G06V 10/42; G06V 20/10; G06V 20/20
See application file for complete search history.

(56) References Cited

U.S. PATENT DOCUMENTS

| 2015/0170002 A1 | 6/2015 | Szegedy et al. |
| 2015/0294191 A1 | 10/2015 | Zhang et al. |

(Continued)

FOREIGN PATENT DOCUMENTS

| CN | 108305574 A | * | 7/2018 | ............ G09F 27/00 |
| WO | 2018/197019 | | 11/2018 | |

OTHER PUBLICATIONS

European Written Opinion dated Oct. 12, 2021 in corresponding European Application No. 19210154.1.

(Continued)

*Primary Examiner* — Tom Y Lu
(74) *Attorney, Agent, or Firm* — Nixon & Vanderhye P.C.

(57) ABSTRACT

Disclosed herein is an image processing apparatus and a control method thereof. The image processing apparatus includes communication circuitry, a storage, and a controller configured to control the image processing apparatus to: perform object recognition for recognizing a plurality of objects in first image data stored in the storage, obtain a score inferred through operation processing through a neural network for the recognized plurality of objects, generate second image data based on the obtained score and proximity of the plurality of objects, and perform image processing based on the second image data.

20 Claims, 14 Drawing Sheets

(56) References Cited

U.S. PATENT DOCUMENTS

| | | |
|---|---|---|
| 2017/0169313 A1 | 6/2017 | Choi et al. |
| 2017/0293824 A1 | 10/2017 | Chen et al. |
| 2018/0121762 A1 | 5/2018 | Han et al. |
| 2020/0051300 A1* | 2/2020 | Shah .................. G06V 40/175 |

OTHER PUBLICATIONS

Search Report dated Apr. 28, 2020 in counterpart International Patent Application No. PCT/KR2019/015450.
Extended Search Report and Written Opinion dated Mar. 31, 2020 in counterpart European Patent Application No. 19210154.1.
Liu, Ligang et al., "Optimizing Photo Composition," Computer Graphics Forum, vol. 29, No. 2, May 2010, pp. 469-478.
Malu, Gautam et al., "Learning Photography Aesthetics with DeepCNNs," arxiv.org, Cornell University Library, 201 Olin Library Cornell University, Ithaca, NY 14853, Jul. 13, 2017, 8 pages.
Wang, Wenguan et al., "Deep Cropping via Attention Box Prediction and Aesthetics Assessment," 2017 IEEE International Conference on Computer Vision (CCV), Oct. 2017, pp. 2205-2213.
Roy, Hiya et al., "Predicting Image Aesthetics Using Objects in the Scene," Proceedings of The 2018 International Joint Workshop on Multimedia Artworks Analysis and Attractiveness Computing in Multimedia, MMART&ACM '18, Jun. 11, 2018, pp. 14-19.
Hsia, Chih-Chun et al., "Representation Learning for Image-based Music Recommendation," LBRS@RecSys '18, Aug. 29, 2018, 2 pages.

* cited by examiner

Steven Feather
Great image

McPeluz
excellent composition

Predrag Peric
:)Beautiful!!:))

IMAGE PROCESSING APPARATUS AND CONTROL METHOD THEREOF

CROSS-REFERENCE TO RELATED APPLICATION

This application is based on and claims priority under 35 U.S.C. § 119 to Korean Patent Application No. 10-2018-0144332, filed on Nov. 21, 2018, in the Korean Intellectual Property Office, the disclosure of which is incorporated by reference herein in its entirety.

BACKGROUND

1. Field

The disclosure relates to an image processing apparatus capable of evaluating aesthetics of an image using deep learning and performing image processing based on the evaluated aesthetics, and a control method thereof.

2. Description of Related Art

Recently, as researches and achievements have been made on deep learning which is a field of machine learning, studies for applying the deep learning to industrial fields have been actively carried out. The deep learning that inputs features, which are extracted from a neural network such as multilayer perceptron, into the neural network again, which overcomes the limitation of the machine learning that is composed of only multilayer-perceptron.

An image processing apparatus configured to output a received image may perform image processing according to a user's lifestyle and provide an aesthetic image. The image processing apparatus may provide an aesthetic experience to a user by providing an image transmitted by the user and simultaneously reproducing or recommending appropriate music. In addition, an image transmitted by the user may be transmitted to the image processing apparatus through various routes such as a user terminal, a cloud server, a universal serial bus (USB), or a high-definition multimedia interface (HDMI) and then the image may be displayed.

However, the conventional method for providing such an aesthetic experience evaluates only the aesthetics of the entire image but does not evaluate the aesthetics by partially recognizing objects of the image. Accordingly, there is a lack of consideration of a region causing the aesthetics, and degradation of the result of the image processing.

Further, the improper evaluation of aesthetics results in recommending inappropriate music upon reproducing or recommending music, and other conventional techniques merely classifies genre of the image and applies the genre to the music recommendation without considering the aesthetic evaluation of the image.

SUMMARY

Embodiments of the disclosure provide an image processing apparatus capable of improving performance of image processing and increasing accuracy of recommending music by performing aesthetic evaluation of individual objects contained in an image or by performing aesthetic evaluation through localization of an image in which objects are merged with each other, and a control method thereof.

Additional aspects of the disclosure will be set forth in part in the description which follows and, in part, will be apparent from the description.

In accordance with an example aspect of the disclosure, an image processing apparatus includes communication circuitry, a storage, and a controller configured to control the image processing apparatus to: perform object recognition for recognizing a plurality of objects in first image data stored in the storage, obtain a score inferred through operation processing through a neural network for the recognized plurality of objects, generate second image data based on the obtained score and proximity of the plurality of objects, and perform image processing based on the second image data.

The controller may control the image processing apparatus to generate a window in the first image data, and perform the object recognition based on the generated window, and the window may be generated based on a predetermined number and size, or generated based on a size or an aspect ratio of the image data on which the object recognition is to be performed.

The storage may store data about the neural network, and the controller may control the image processing apparatus to perform the operation processing on the generated window through the neural network, and select a window including each of the plurality of objects based on a reliability and a type of the object inferred in the operation processing.

The score may include an aesthetic score of an object contained in the selected window, and after performing the neural network processing on the selected window, the controller may control the image processing apparatus to extract a feature from the neural work and obtain the aesthetic score based on the extracted feature.

The feature may include at least one of color histogram features, text features, symmetry, rules of thirds features, or high level semantic features.

The communication circuitry may communicate with a server configured to perform an operation processing through the neural network, and the neural network may be trained based on labeling contained in data crawling from the server.

The controller may control the image processing apparatus to determine the proximity based on a distance between the selected windows and merge the plurality of windows based on the obtained score and the proximity.

The controller may control the image processing apparatus to input the merged window into the neural network, and compare the inferred score with a predetermined reference value.

Based on the comparison result, the controller may control the image processing apparatus to generate a second image including the merged window.

After performing an operation processing on the second image data through the neural network, the controller may control the image processing apparatus to perform image processing on the second image data to adjust a resolution based on the result inferred from the neural network.

After performing an operation processing on the first image data through the neural network, the controller may control the image processing apparatus to classify a genre of the second image data inferred from the operation processing, and perform image processing to transfer the style of the second image data based on the classified genre.

The image processing apparatus may further include a sensor configured to collect data about the surrounding environment of the image processing apparatus, and the controller may control the image processing apparatus to perform image processing to adjust brightness or contrast of the second image based on the collected data.

The controller may control the image processing apparatus to store a first feature extracted from the neural network based on the selected window, perform the neural network processing on the image processed second image, and extract a second feature from the neural network.

After performing an operation processing on the first and second feature through the neural network, the controller may control the image processing apparatus to classify a mood of the second image.

The image processing apparatus may further include a display configured to output the image processed second image data; and a sound outputter comprising sound output circuitry configured to reproduce a sound source, and the controller may control the image processing apparatus to recommend a playlist based on the classified mood, control the sound outputter to output the sound source contained in the playlist, and control the display to output the image-processed second image data.

In accordance with another example aspect of the disclosure, a method of controlling of an image processing apparatus includes performing object recognition for recognizing a plurality of objects in first image data, obtaining scores inferred through an operation processing through a neural network for the recognized plurality of objects, generating second image data based on the obtained score and the proximity of the plurality of objects, and performing image processing on the second image data based on features extracted from the neural network.

The performance of the object recognition may include generating a window in the first image data; and performing operation processing on the generated window through the neural network, and selecting a window including each of the plurality of objects based on a reliability and a type of the object inferred through the neural network processing.

The generation may include determining the proximity based on a distance between the selected windows, merging the plurality of windows based on the inferred score and the proximity, performing operation processing on the merged window through the neural network, comparing the score inferred in the operation processing with a predetermined reference value, and generating a second image including the merged window based on the comparison result.

The performance may include performing operation processing on the second image data through the neural network, adjusting a resolution based on the result inferred from the operation processing through the neural network, classifying a genre of the second image inferred in the operation processing through the neural network, and transferring a style of the second image data based on the classified genre.

The method may further include storing a first feature extracted in the operation processing through the neural network based on the selected window, performing the operation processing on the image processed second image data through the neural network, re-performing the operation processing on the second feature and the first feature extracted from the neural network processing through the neural network, and outputting a sound source based on a playlist received based on a mood of the second image data inferred in the operation processing.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
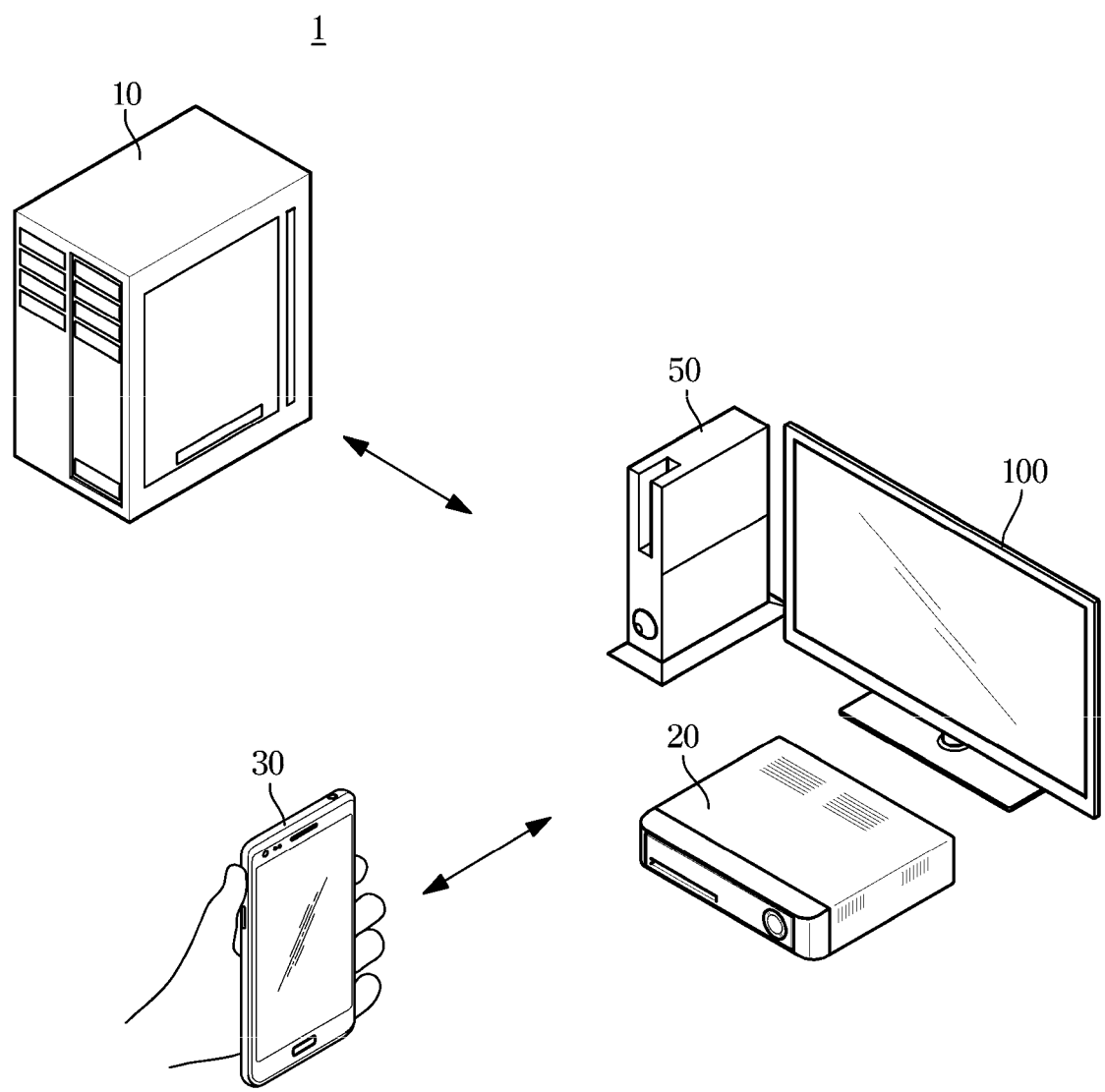
FIG. 1 is a diagram illustrating an example system including a server and an image processing apparatus according to an embodiment of the disclosure.

In the following description, like reference numerals refer to like elements throughout the disclosure. Well-known functions or constructions may not be described in detail where they might obscure the one or more example embodiments with unnecessary detail. Terms such as "unit", "module", "member", and "block" may be embodied as hardware or software or any combination thereof. According to various example embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Where a part "includes" or "comprises" an element, unless there is a particular description contrary thereto, the part may further include other elements, not excluding the other elements.

Throughout the disclosure, when a member is "on" another member, this includes not only when the member is in contact with the other member, but also when there is another member between the two members.

It will be understood that, although the terms first, second, third, etc., may be used herein to describe various elements, but is should not be limited by these terms. These terms are used to distinguish one element from another element.

As used herein, the singular forms "a," "an" and "the" are intended to include the plural forms as well, unless the context clearly indicates otherwise.

An identification code may be used for the convenience of the description but is not intended to illustrate the order of each step. Each step may be implemented in the order different from the illustrated order unless the context clearly indicates otherwise.

Reference will now be made in detail to various example embodiments of the disclosure, examples of which are illustrated in the accompanying drawings.

FIG. 1 is a diagram illustrating an example system including a server and an image processing apparatus according to an embodiment of the disclosure.

Referring to FIG. 1, a system 1 may include an image processing apparatus (e.g., including image processing circuitry) 100, and a server 10, a set-top box 20, a user terminal 30 and a game console 50 which are configured to provide an image to the image processing apparatus 100.

The image processing apparatus 100 may refer, for example, to a device capable of displaying an image to a user after processing the received image. In FIG. 1, the image processing apparatus 100 is shown as a digital television (DTV) connected to the set-top box 20 and the game main body 50. However, the image processing apparatus 100 is not limited thereto, and thus the image processing apparatus 100 may include a variety of devices capable of displaying an image such as, for example, and without limitation, an e-book reader, a desktop PC, a laptop PC, a netbook computer, a tablet PC, a slate PC, etc.

The set-top box 20 may refer, for example, to a receiver for digital satellite broadcasting, and the set-top box 20 may be configured to allow the image processing apparatus 100 to receive a digital broadcasting, which is provided from a broadcasting company, with an analog TV. Further, the set-top box 20 may refer, for example, to equipment that is required to implement an interactive TV and a video on demand (VOD). FIG. 1 illustrates that the set-top box is an external type that is connected to the outside of the image processing apparatus 100, but is not limited thereto. The set-top box 20 may be provided as an internal type.

The user terminal 30 may refer, for example, to a wearable device capable of transmitting an image to the image processing apparatus 100 through wireless communication. As an example, the user terminal 30 may transmit a photograph taken through a photographing apparatus included in a device to the image processing apparatus 100. The image processing apparatus 100 may perform image processing described below on a photograph transmitted by the user terminal 30, and recommends or reproduces music suitable for a mood of the photography to be transmitted.

The user terminal 30 may, for example, be implemented as a portable terminal configured to be connected to the image processing apparatus 100 through a network, and may include various kinds of hand-held based wireless communication apparatus such as, for example, and without limitation, a Personal Communication System (PCS), a Global System for Mobile communications (GSM), a Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smart phone, a wearable device such as a watch, a ring, a bracelet, a anklet, a necklace, glasses, contact lenses, a head-mounted device (HMD), or the like.

The game console 50 may refer, for example, to an interactive entertainment electronic device using a display signal such as a composite video or a high definition multimedia interface (HDMI) used in the image processing apparatus 100. For example, the game console 50 includes Xbox™, and PlayStation™, but the disclosure is not limited thereto.

The server 10 may include, for example, a streaming server or a relay server that provides images to the image processing apparatus 100 through a network. In addition, the server 10 may transmit a web image such as a browser image to the image processing apparatus 100 through network communication.

The server 10 may provide a neural network that the image processing apparatus 100 may store. Before providing the neural network to the image processing apparatus 100, the server 10 may train the neural network and store versions of various other neural networks, which may, for example, be referred to as deep learning.

The image processing apparatus 100 may be limited in a memory and Computer Processor Unit (CPU) capacity in comparison with the server 10. Therefore, the image processing apparatus 100 may be limited to updating the neural network after collecting and storing learning data. Therefore, the server 10 may continuously update a weight, bias, and activation function contained in the neural network, thereby improving the inference result of the neural network, and may provide the trained neural network to the image processing apparatus. 100.

The neural network is not necessarily trained only in the server 10. For example, the image processing apparatus 100 may train the neural network using data that is received or stored.

The image processing apparatus 100 may receive images through various other electronic devices or networks in addition to the server 10, the set-top box 20, or the game console 50 described above.

Figure 2:
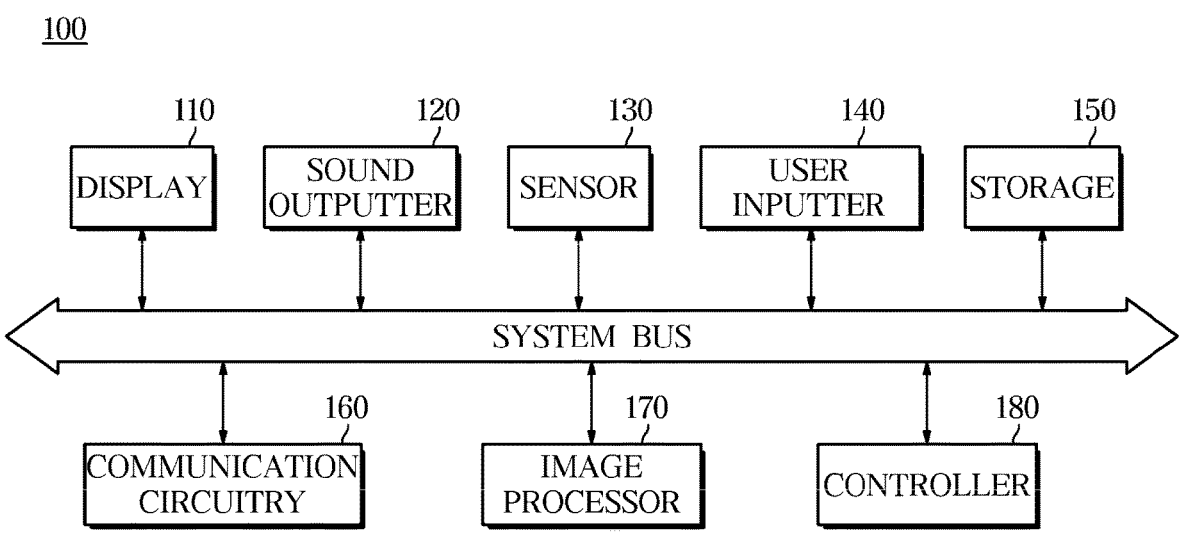
FIG. 2 is a block diagram illustrating an example image processing apparatus according to an embodiment of the disclosure.

FIG. 2 is a block diagram illustrating an example image processing apparatus according to an embodiment.

Referring to FIG. 2, the image processing apparatus 100 includes communication circuitry 160 receiving an image from the outside, an image processor (e.g., including image processing circuitry) 170 processing the image received through the communication circuitry 160, a display 110 displaying image data processed by the image processor 170, a sound outputter (e.g., including sound output circuitry) 120 outputting sound data that is received together with an image or outputting a sound source contained in a music playlist to be recommended to a user, a sensor 130 collecting information on the surrounding environment in which the image processing apparatus is installed, an user inputter (e.g., including user input circuitry) 140 receiving a command input, for example, by a user, a storage 150 storing data, and a controller (e.g., including processing circuitry) 180 performing an operation for processing of the image processor 170 and performing a control of an operation of the image processing apparatus 100. These components may be interconnected via a system bus.

Hereinafter the controller 180 may include various processing circuitry and may be described as being separate from the storage 150 and the image processor 170, but depending on embodiments, the controller 180 may be implemented as a single system on chip (SOC) integrated with the image processor 170.

The communication circuitry 160 may include various communication circuitry and receive an image from at least one of the server 10, the set top box 20, the user terminal 30 or the game console 50 and may transmit various data, images and recommendation of music playlist processed by the controller 180 to the outside.

For example, in addition to receiving an image from the server 10, the communication circuitry 160 may receive the neural network trained by the server 10 and transmit the received neural network to the storage 150. Using the neural network received by the communication circuitry 160, the controller 180 may include various processing circuitry and perform an aesthetic evaluation of the received image and generate a region of the image with high aesthetics. In addition, the controller 180 may use the neural network to perform the image processing for improving the aesthetics, and classify a mood of the image, which is image-processed by the neural network. Detailed description thereof will be described later with reference to other drawings below.

The trained neural network may be transmitted to the image processing apparatus 100 as the form of coding of a program, but is not limited thereto.

The communication circuitry 160 may receive the neural network from the server 10, on the other hand, the communication circuitry 160 may request the update of the neural network to the server 10. Because the neural network as used herein may refer to machine learning that forms a neural structure capable of performing deep learning as mentioned above, the weight and the bias corresponding to the configuration of the neural network continuously change, thereby improving the reliability and result of the inference (output of the neural network). Therefore, in addition to receiving the neural network from the server 10, the communication circuitry 160 may also request an update of the received neural network to the server 10.

The communication circuitry 160 may include at least one component capable of communication with an external device. For example, the communication circuitry 160 may include at least one of a short-range communication module, a wired communication module, and a wireless communication module, each module including various communication circuitry.

The short-range communication module may include a variety of short range communication modules, each including various communication circuitry, which is configured to transmit and receive a signal using a wireless communication module in the short range, such as, for example, and without limitation, a Bluetooth module, an Infrared communication module, a Radio Frequency Identification (RFID) communication module, a Wireless Local Access Network (WLAN) communication module, an NFC communications module, a ZigBee communication module, etc.

The wired communication module may include a variety of wired communication modules, each including various communication circuitry, such as, for example, and without limitation, a Local Area Network (LAN) module, a Wide Area Network (WAN) module, Value Added Network (VAN) module, etc. and a variety of cable communication modules, each including various communication circuitry, such as, for example, and without limitation, a Universal Serial Bus (USB), a High Definition Multimedia Interface (HDMI), a Digital Visual Interface (DVI), recommended standard 232 (RS-232), power line communication or plain old telephone service (POTS).

The wireless communication module may include a wireless communication module supporting a variety of wireless communication methods, such as, for example, and without limitation, a Wifi module, a Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), etc.

The image processor 170 may include various image processing circuitry and performs pre-processing or post-processing of the received image. For example, and without limitation, the communication circuitry 160 may receive an image in the form of a modulated signal, and the image processor 170 may perform pre-processing to demodulate the signal. In addition, the image processor 170 may perform demuxing of the demodulated signal into an image signal.

In addition to the above-described preprocessing, the image processor 170 may perform the post-processing on the image by applying the evaluated aesthetics of the image.

For example, the image processor 170 may perform basic post-processing such as removing distortion contained in the image, and adjusting the aspect ratio of the image according to the configuration of a display panel contained in the display 110. Further, the image processor 170 may perform a super-resolution adjustment that adjusts the resolution based on the result inferred by the neural network, or style transfer based on the genre of the image classified by the neural network.

The image processor 170 may perform the post-processing to adjust the brightness and contrast of the image based on the surrounding environment collected by the sensor 130 such as data related to the current room lighting. A more detailed description thereof will be described later with reference to other drawings below.

The display 110 displays image data processed by the image processor 170.

There is no limit to the implementation of the display 110, and the display 110 may include a display panel that is non-self-emission type such as a liquid crystal type or a display that is self-emission type such as an organic light emitting diode (OLED) type. In addition to the display panel, the display 110 may additionally include an additional configuration depending on the implementation method of the display panel. For example, in the case of a liquid crystal type, the display 110 includes a liquid crystal display panel (not shown), a backlight unit (not shown) for supplying light to the liquid crystal display panel (not shown) and a panel drive substrate (not shown) for driving the display panel.

The sound outputter 120 may include various sound output circuitry that outputs an audio signal, which is received with the image, as sound. In addition, the sound outputter 120 may reproduce a sound source contained in the music playlist recommended by the controller 180 or the sound source selected by the user while the processed image is displayed.

For example, the sound outputter 120 may transmit a sound using the principle of changing air pressure by vibrating the air according to the audio signal. The sound outputter 120 may include, for example, and without limitation, a unit speaker corresponding to an audio signal of a certain channel and may include a plurality of unit speakers corresponding to a plurality of audio signals. The sound outputter 120 may include various types speaker such as, for example, and without limitation, a woofer speaker, a midrange speaker, and a tweeter speaker depending on the frequency band of the sound to be output, and one or more types thereof may be selected and then applied to the image processing apparatus 100.

According to a user's manipulation or input, the user inputter 140 may include various user input circuitry and may transmit various predetermined control commands or information to the controller 180 or the image processor 170. The user inputter 140 may transmit various events generated by a user's manipulation to the controller 180 or the image processor 170 according to a user's intention.

For example, the user inputter 140 may receive a command for selecting one sound source from a playlist recommended by the controller 180. Based on the received input command, the controller 180 may output an image processed by the image processor 170, together with the selected sound source.

The user inputter 140 may be implemented in various forms according to an information input method. For example, the user inputter 140 may include, for example, and without limitation, a button provided outside the image processing apparatus 100, a touch screen provided on the display 110, a microphone (not shown) to which a user's utterance is input, and a user interface environment installed in the image processing apparatus 100 such as a camera (not shown) for imaging or detecting the environment. A remote controller (not shown) may also be considered as one configuration of the user interface environment. However, because the remote controller (not shown) is separated from the main body of the image processing apparatus 100, the remoter controller (not shown) transmits a control signal to the image processing apparatus 100 through a separate control signal communication circuitry 160 provided in the main body of the image processing apparatus 100.

The sensor 130 may be provided in the main body of the image processing apparatus 100 to collect data about the surrounding environment in which the image processing apparatus 100 is located.

For example, the sensor 130 may detect not only the brightness of the light and the direction of the light but also the color temperature according to the surrounding environment. Therefore, the sensor 130 may include an illuminance sensor detecting the brightness of the light, and may be provided as a plurality of illuminance sensors for detecting the direction of the light. In addition, the sensor 130 may include a color sensor to detect the color temperature.

The sensor 130 may further include, for example, and without limitation, an infrared (IR) sensor, an ultrasonic sensor, a radio frequency (RF) sensor, or the like, and may detect a user's position. In addition, the sensor 130 may capture a predetermined area using an image pickup device such as, for example, and without limitation, a CMOS, a CCD, or the like, and detect a user's position through image analysis of the captured image.

Data about the surrounding environment of the image processing apparatus 100 is not necessarily collected through the sensor 130. For example, the image processing apparatus 100 may communicate with the user terminal 30, and when it is determined that the user terminal 30 is placed within a predetermined distance, the image processing apparatus 100 may request data about the surrounding environment to the user terminal 30.

The storage 150 may store various data generated or used in the process of the controller 180 or the image processor 170.

For example, the storage 150 may store data (hereinafter, referred to as a neural network) for operation processing through the neural network from the server 10, and may store an image data when an image is input.

The storage 150 may store a plurality of neural networks each having a different role. For example, the storage 150 may store various neural networks used for supervised learning, unsupervised learning, or reinforcement learning. Each stored neural network may be used for aesthetic analysis, image processing and music recommendation for improving aesthetics, described below.

By being accessed by the controller 180, the storage 150 may read, write, edit, delete, update, etc. the stored data. The storage 150 may be implemented with non-volatile memory that stores data regardless of whether or not the system power of the image processing apparatus 100 is supplied, and the non-volatile memory may include, for example, and without limitation, a flash memory, a hard-disc drive, a solid-state (SSD), or the like.

The storage 150 may be not necessarily separated from the controller 180 and provided as a separate memory, and thus the storage 150 may be formed as a single chip with the controller 180. The embodiment is not limited to that the neural network is stored only in non-volatile memory.

The controller 180 may include various processing circuitry and correspond to a component that performs a central operation for operating the configurations of the image processing apparatus 100, and basically, the controller may, for example, be a processor that plays a central role in interpreting and operating data.

The controller 180 may include various processing circuitry and performs overall control of the operation of the image processing apparatus 100 to be described later, and may perform aesthetic evaluation of individual objects contained in the image or performs aesthetic evaluation of an image, in which objects are merged, through localization. A detailed description of the operation performed by the controller 180 will be described later with reference to other drawings below.

The controller 180 may include various processing circuitry, such as, for example, and without limitation, a processor register (not shown) in which instructions to be processed are stored, an arithmetic logic unit (ALU) (not shown) for performing comparison, determination, and operation, a control processor unit (CPU) (not shown) performing an internal control for interpreting instructions and for correctly execution, an internal bus (not shown), a cache (not shown), etc.

In addition to the above-described configuration in FIG. 2, the image processing apparatus 100 may further include a variety of configurations and may add, delete and change at least one element in accordance with the performance of the configuration. Each configuration shown in FIG. 2 may include, for example, a software component and/or hardware components such as a Field Programmable Gate Array (FPGA) and an Application Specific Integrated Circuit (ASIC).

Figure 3:
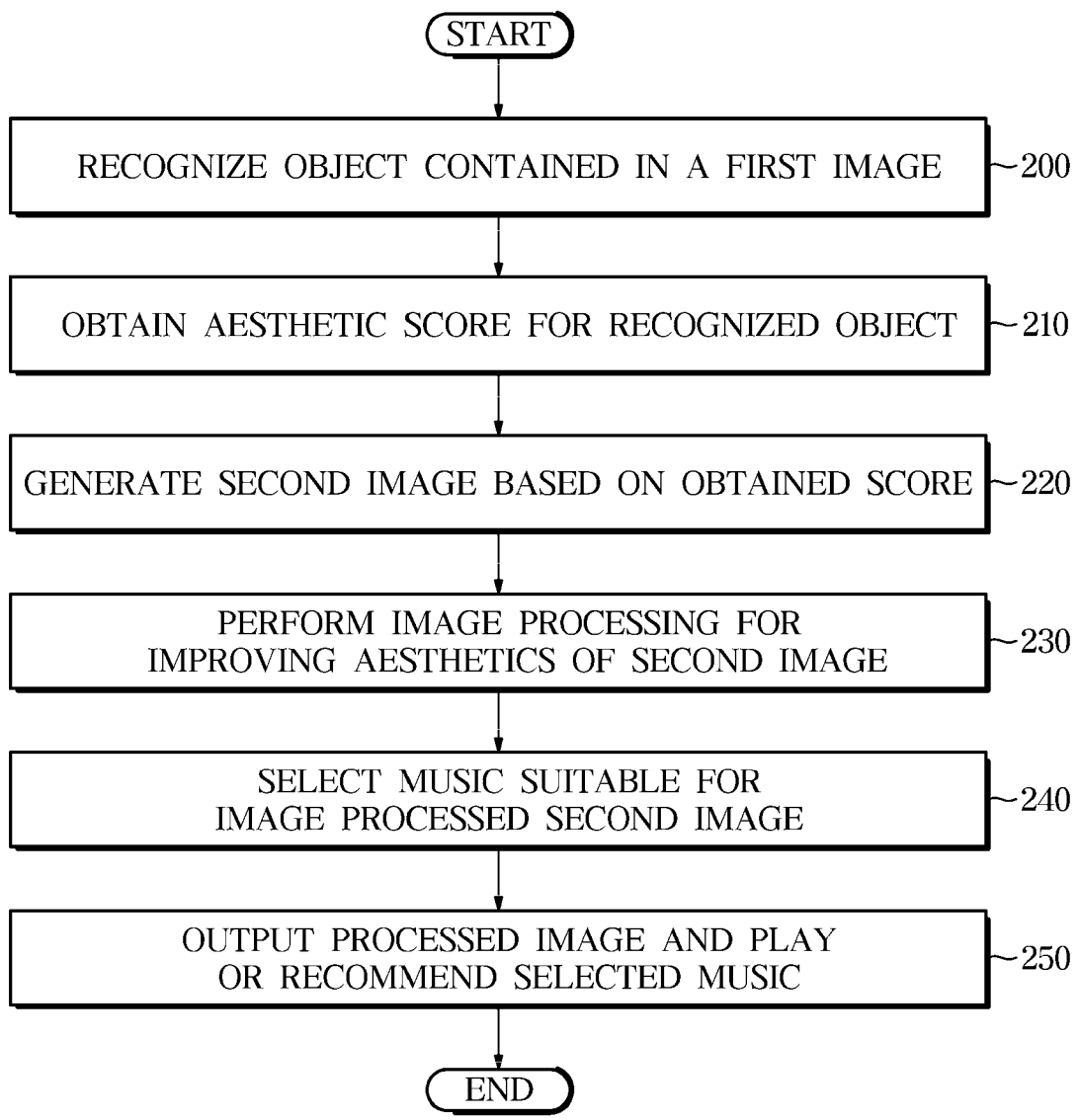
FIG. 3 is a flowchart illustrating an example method of controlling the image processing apparatus according to an embodiment.
Figure 4:
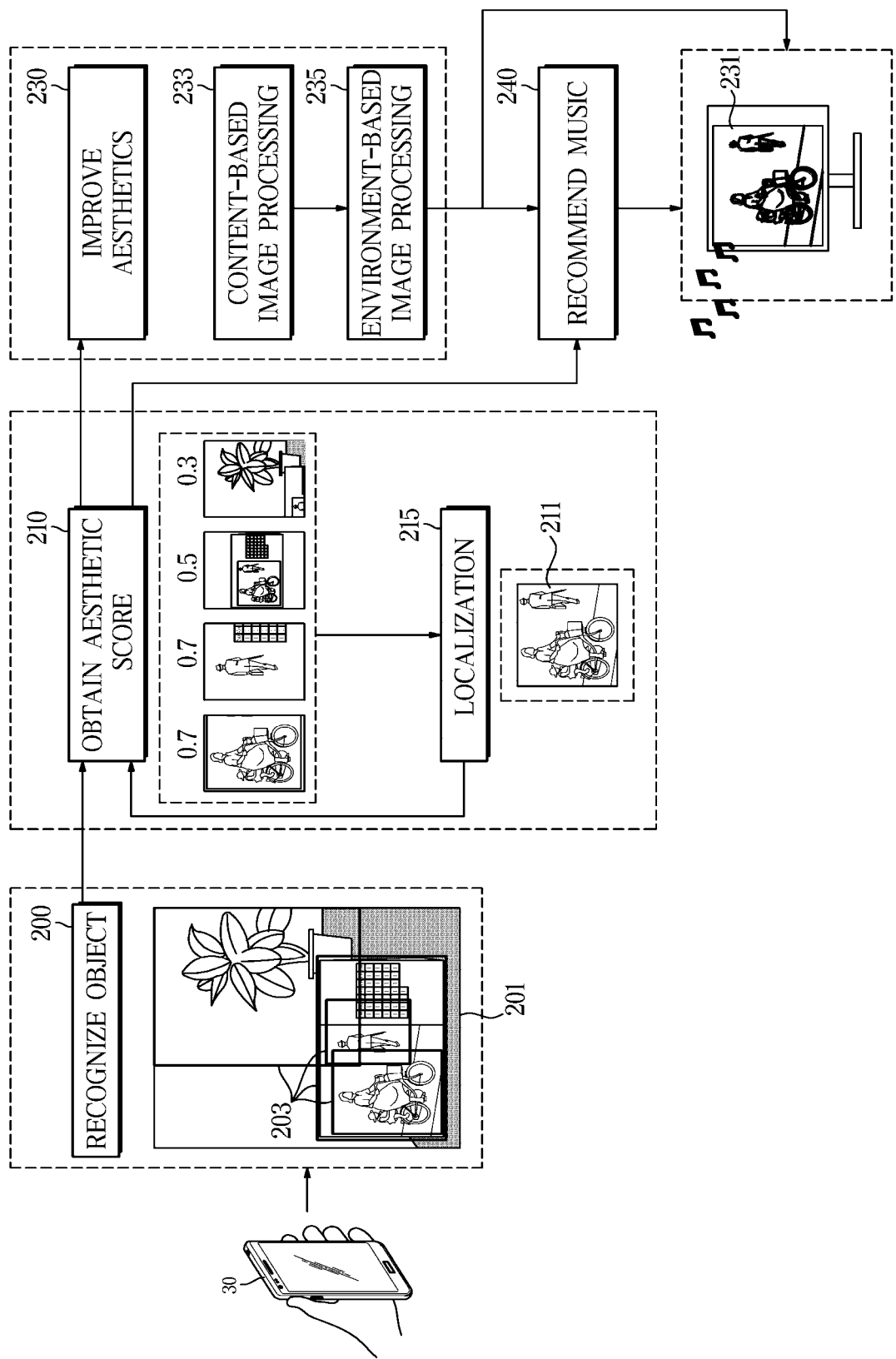
FIG. 4 is a diagram illustrating an image example with the flowchart of FIG. 3 according to an embodiment.

FIG. 3 is a flowchart illustrating an example method of controlling the image processing apparatus according to an embodiment, and FIG. 4 is a diagram illustrating an image example with the flowchart of FIG. 3.

Referring to FIGS. 3 and 4, the image processing apparatus 100 may recognize an object or objects contained in a first image 201 (200).

The first image 201 may refer, for example, to image data received from the outside and an image, which is before performing image processing contained in the control method. The first image 201 may be image data received from the outside including the user terminal 30, and also be image data that has been pre-processed through the image processor 170.

Object recognition (200) may refer, for example, to performing an object recognition algorithm for recognizing an object contained in the image. A case in which the image processing apparatus 100 randomly generates several windows 203 or generates windows 203 by generating a frame around a region, which is separated through an image separation, will be described as an example, but is not limited thereto. Therefore, the object recognition may be performed through various object recognition algorithms.

The image processing apparatus 100 may obtain an aesthetic score for the recognized object (210).

The aesthetic score may be obtained through neural networks stored in the storage 150. For example, the controller 180 may perform arithmetic processing through a neural network stored in the storage 150 for the recognized object. The controller 180 may input an object contained in the image to a neural network, and the neural network may infer an aesthetic score 210 of the object and the type of the input object.

Neural networks may be trained to score aesthetics through images that are evaluated by people on the Internet or Social Network Service (SNS). The trained neural network extracts a feature from the window 203 including the recognized object, and classifies the aesthetic score 210 and the type of the object based on the extracted feature.

The image processing apparatus 100 may generate a second image 211 based on the obtained score (220).

The second image 211 may, for example, be image data generated by localizing a region including the object having a high aesthetic score based on the first image data. For example, the image processing apparatus 100 may merge two or more objects based on the score of the individual object that has obtained the score, and the proximity of the window 203, and then localizes the first image including the merged object 215. This process may be repeatedly performed until a score, which is inferred by inputting the merged object to the neural network, is equal to or greater than a predetermined value.

The image processing apparatus 100 generates an image including the merged objects having an aesthetic score equal to or greater than the predetermined value, as a second image 211.

The image processing apparatus 100 may perform the image processing for improving aesthetics of the second image 211 (230).

For example, the image processing for improving aesthetics may include content-based image processing (233) and environment-based image processing (235).

The content-based image processing (233) not only adjusts scale and perspective, but may also improve aesthetics of the second image 211 through, for example, the super resolution and style transfer that are performed using the neural network.

The environment-based image processing (235) may be image processing for adjusting brightness and contrast based on data of the surrounding environment in which the image processing apparatus 100 is located.

The image processing apparatus 100 may select music suitable for the image processed second image 231 (240).

For example, the image processing apparatus 100 may input a feature extracted in operation 210 and a second image 231 (hereinafter, referred to as a third image) that has been image processed, to the neural network, and may generate a music playlist based on the feature extracted from the neural network. For example, when the extracted feature is input to a classification stage of the neural network, the neural network classifies the mood of the third image 231 such as, for example, and without limitation, happiness, sadness, excitement, anger, calmness, etc. The image processing apparatus 100 may receive a music recommendation list, selected according to the classified mood, from the server 10 or selects a sound source stored in the storage 150 as music suitable for the third image 231.

The image processing apparatus 100 may output the third image 231 that has been image processed, and may recommend or reproduce the selected music, thereby providing the image and music to a user (250).

Accordingly, the image processing apparatus 100 may more accurately evaluate the aesthetics than the conventional image processing apparatus that evaluates the aesthetics, and provide image processing and music recommendation according to the aesthetic evaluation.

In the following drawings, control methods described with reference to FIGS. 3 and 4 will be described in greater detail.

Figure 5:
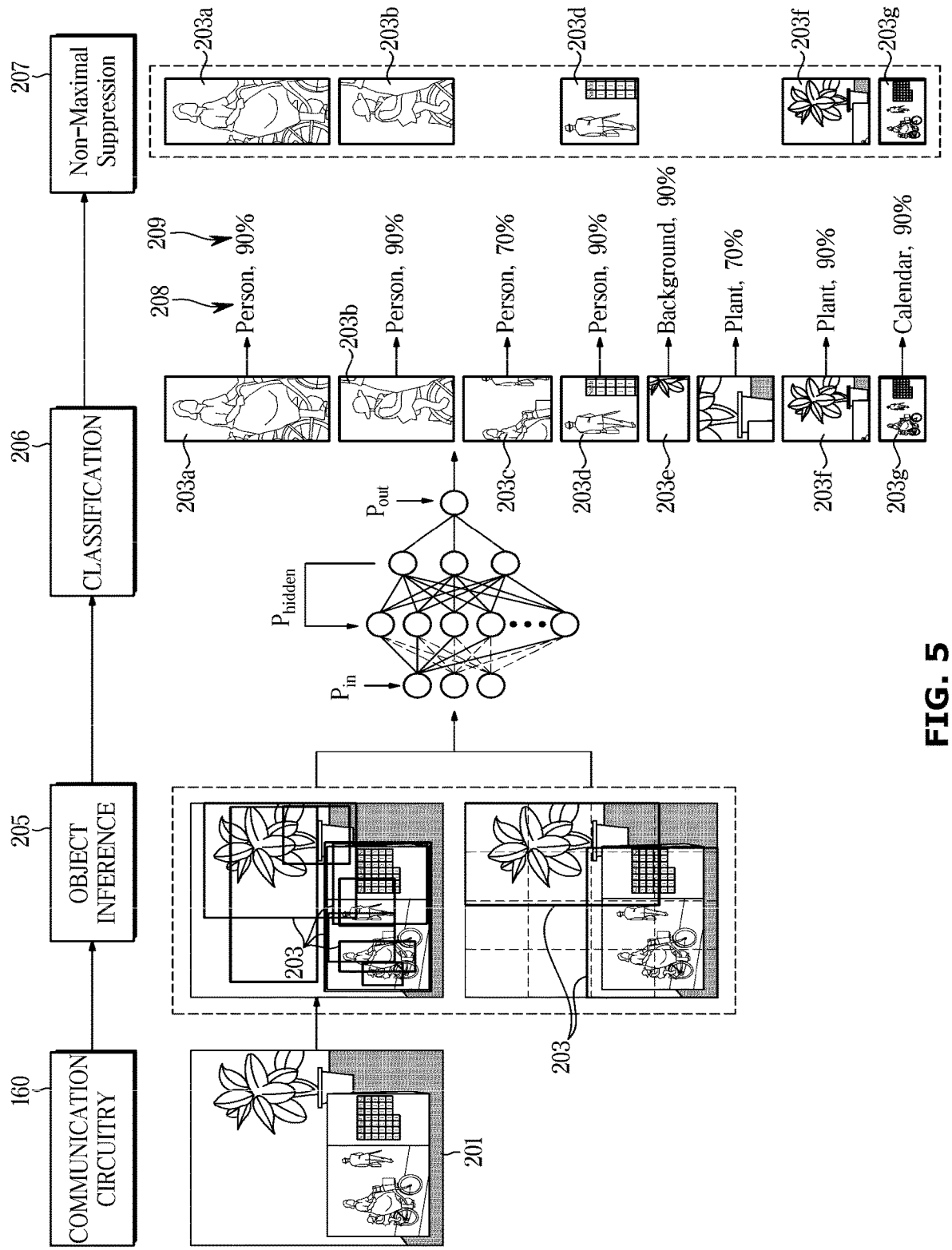
FIG. 5 is a diagram illustrating an example of object recognition according to an embodiment.

FIG. 5 is a diagram illustrating an example of object recognition, according to an embodiment.

Referring to FIG. 5, the image processing apparatus 100 receives the first image 201 through the communication circuitry 160.

The image processing apparatus 100 identifies the positions and types of objects of all the objects present in the first image 201.

For example, object recognition may be divided into inferring an object (205) for generating the window 203, and classifying the types of objects (206).

The object inference (205) may use various methods used in the object recognition algorithm.

According to an embodiment, based on the first image 201, the image processing apparatus 100 may arbitrarily generate a window 203 having a predetermined horizontal and vertical ratio and including various sizes and numbers.

According to another embodiment, the image processing apparatus 100 may perform image segmentation, for example color based segmentation, on the first image 201 and generate the window 203 around the identified segment.

The generated plurality of windows 203 is input to the neural network, and the neural network classifies each window 203 into various categories (206).

For example, the neural network may classify the type of the object (208) contained in the window 203 and the reliability (209) for determining whether the window includes the object.

The neural network for classifying the window 203 may include a multi-layer perceptron. Perceptron may refer, for example, to the basic structure of machine learning that performs the same function as a neuron, which is the basic structure of the human neural network. For example, the perceptron may multiply the input value by a weight, add the bias, and input the modified input value to a transfer function or an activation function. The modified input value satisfying the threshold value of the activation function is output as the output value. The perceptron may, for example, be a structure that is trained to infer a desired result value from a repeated input value, by adjusting the weight and the bias by itself to make an output value be a desired result value.

On the other hand, basic perceptron may include an input-layer Pin and an output-layer Pout. However, a hidden-layer Phidden may be inserted in the middle, and may become the multi-layer perceptron as shown in FIG. 5. The multi-layer perceptron contained in the neural network may adjust the hidden layer Phidden so that the output value, which is output from the output-layer Pout through the back propagation, approaches the desired result value, thereby improving learning ability.

In order to evaluate the type and reliability of the object, the image processing apparatus 100 may input each window 203 as an input value of the trained neural network. The neural network may output the type (208) and the reliability (209) of the objects contained in the window 203 by the adjusted weight, bias and transfer functions.

As an example of FIG. 5, the image processing apparatus 100 may input a first window 203*a* generated in the first image 201 to the neural network, and the neural network may classify an object contained in the first window 203*a* as a person (208), and at the same time, infer a reliability (209) of 90% indicating that the first window 203*a* includes the object.

The neural network may classify an object contained in a second window 203*b*, as a person different from the person (208) classified in the first window 203*a*, while inferring a reliability of 90% indicating that the second window 203*b* includes the object. Further, the neural network may classify an object contained in a third window 203*c*, as a person the same as the person (208) classified in the first window 203*a*, while inferring a reliability of 70% indicating that the third window 203*c* includes the object. The neural network may classify an object contained in a fourth window 203*d*, as another person different from the first to third person, while inferring a reliability of 90% indicating that the fourth window 203*d* includes the object.

The neural network may classify an object contained in a fifth window 203*e* as a background and infer a reliability of 90%.

When the classification is completed, the image processing apparatus 100 may remove the fifth window 203*e* that is classified as the background.

After removing the window classified as a background, the plurality of windows including the same object may be present. Accordingly, the image processing apparatus 100 may perform non-maximal suppression (NMS) (207).

Non-maximal suppression (NMS) may refer, for example, to post-processing that merges detection results containing the same object. In other words, when two or more windows overlap for the same object, the image processing apparatus 100 removes a window having a low reliability and maintains a window having a high reliability. Through this method, the image processing apparatus 100 selects only one window for one object.

Referring again to FIG. 5, as an example, when there are two windows 203*a* and 203*c* including the same person, the image processing apparatus 100 may select the first window 203*a* having the reliability of 90% higher than the reliability of 70%.

Through this process, the image processing apparatus 100 may select the first window 203*a*, the second window 203*b*, the fourth window 203*d*, the sixth window 203*f*, and the seventh window 203*g* as the result of the object recognition of the first image 201.

The selected window is used for obtaining an aesthetic score through the aesthetic analysis illustrated above with reference to FIG. 3.

Figure 6:
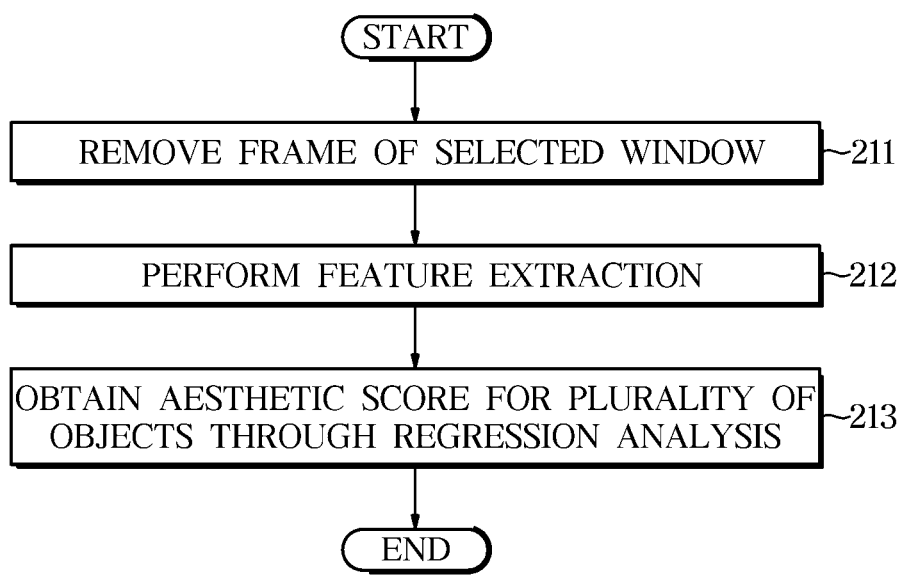
FIG. 6 is a flowchart illustrating an example method of obtaining an aesthetic score during aesthetic analysis according to an embodiment.
Figure 7:
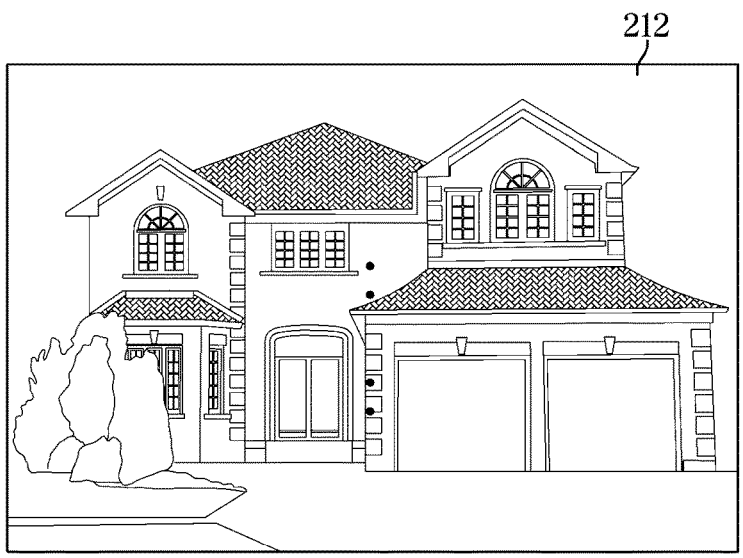
FIG. 7 is a diagram illustrating an example of data learned by a neural network according to an embodiment.
Figure 7:
Figure 7:
Figure 7:

FIG. 6 is a flowchart illustrating an example method of obtaining an aesthetic score during aesthetic analysis according to an embodiment, and FIG. 7 is a diagram illustrating an example of data learned by a neural network. In order to avoid redundant description, FIGS. 6 and 7 will be described together below.

Referring to FIG. 6, the image processing apparatus 100 may remove a frame of the selected window (211)

The image processing apparatus 100 may extract a feature from the image of the window from which the frame is removed (212).

Feature extraction may refer, for example, to feature extraction used in deep learning, and various feature extraction may be used. For example, the image processing apparatus 100 may extract features including, for example, and without limitation, at least one of color histogram features, text features, symmetry, rules of thirds features, high level semantic features, etc., using the neural network. The high level semantic features may refer, for example, to a feature that describes a scene or a feature output by the neural network after learning through another image model.

When the feature is extracted, the image processing apparatus 100 obtains an aesthetic score for the plurality of objects through, for example, regression analysis (213).

The regression analysis may infer a function that generates data input to the neural network. The neural network may be trained based on a score model that is evaluated on a large amount of image data crawling through the Internet or SNS.

Referring to FIG. 7, an image 212 is displayed on the Internet or SNS, and people's opinions such as 'like' or 'up-votes' and 'excellent composition' 212*a* are displayed in the image 212. The neural network may be trained in the server based on the data (e.g., enormous data) as shown in FIG. 7.

Referring again to FIG. 6, the image processing apparatus 100 may extract a feature from an image of a window, in which an object is recognized, through the trained neural network, and may perform the regression analysis using the extracted feature as an input value. Through the regression analysis, the neural network assigns a score (aesthetic score) from 0 to 1 to each object.

The neural network does not necessarily infer the aesthetic score between 0 and 1, and the image processing apparatus 100 may obtain a result value of inferring aesthetics in various score ranges.

Figure 8:
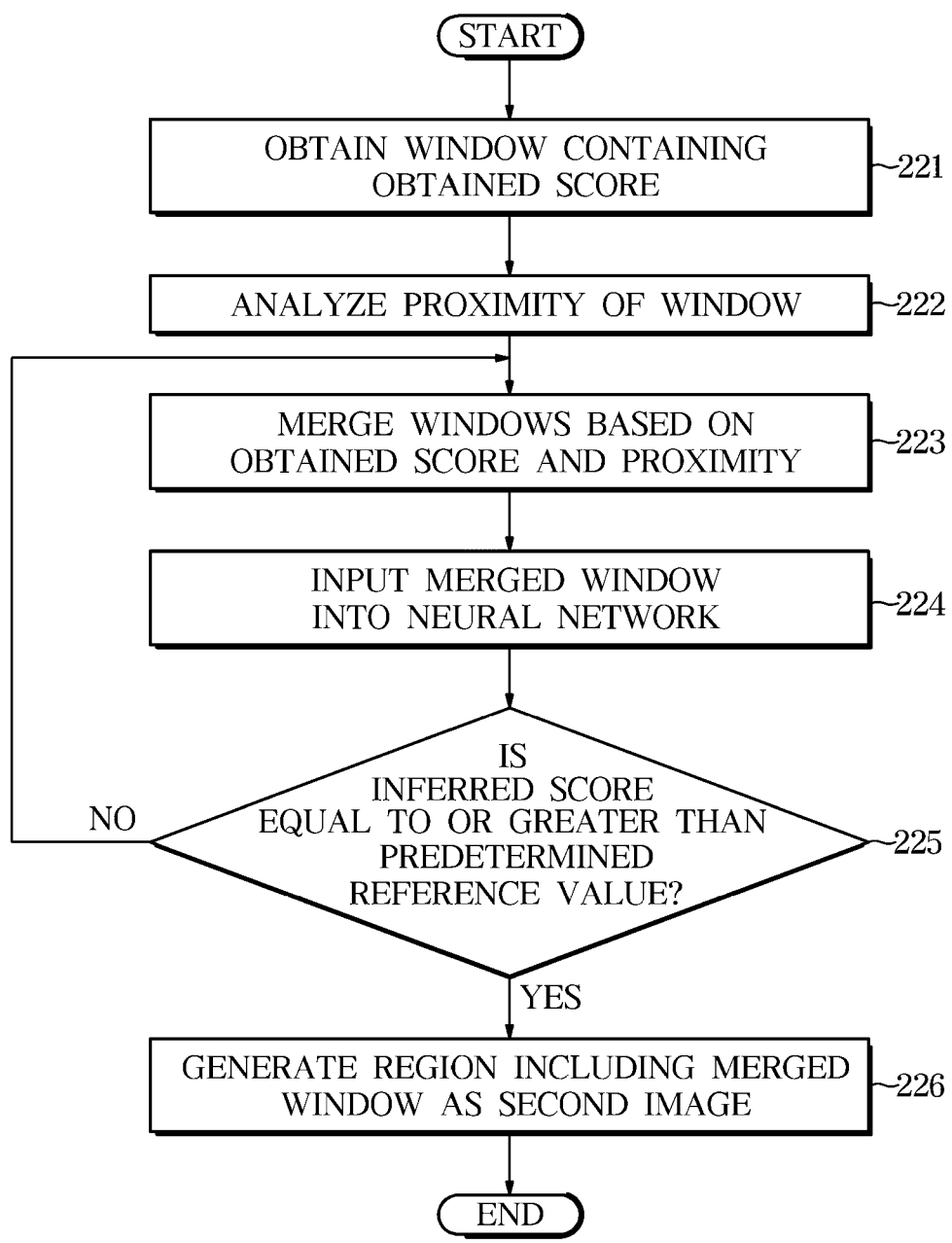
FIG. 8 is a flowchart illustrating an example method of generating a second image according to an embodiment.
Figure 9:
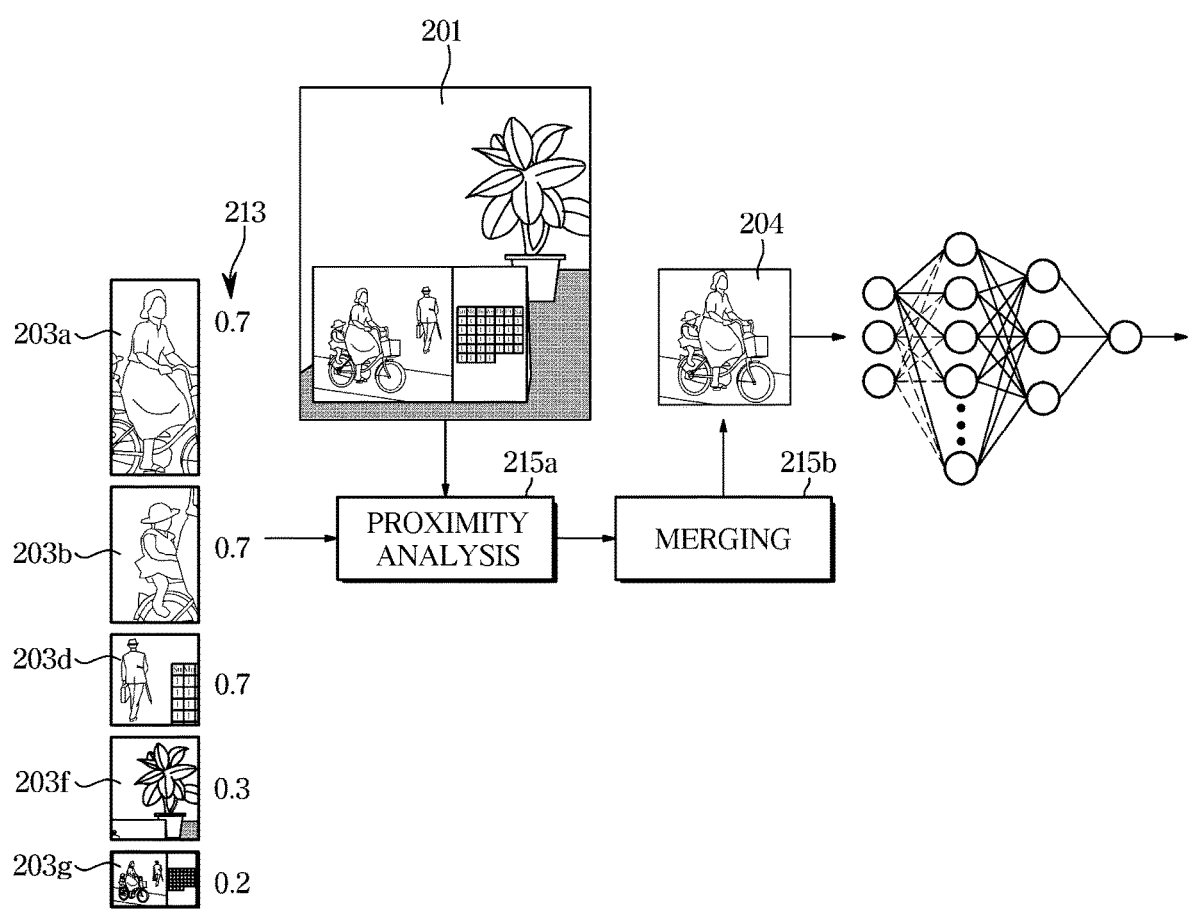
FIG. 9 is a diagram illustrating FIG. 8 with an image as an example, according to an embodiment.

FIG. 8 is a flowchart illustrating an example method of generating a second image according to an embodiment, and FIG. 9 is a diagram illustrating FIG. 8 with an image as an example according to an embodiment. In order to avoid redundant description, FIGS. 8 and 9 will be described together below.

Referring to FIGS. 8 and 9, the image processing apparatus 100 may obtain the window containing the obtained score (221).

The image processing apparatus 100 may extract a feature from an image of the window 203 through the neural network, and obtain an aesthetic score 213 for each window through, for example, the regression analysis.

Referring to FIG. 9, as an example, the image processing apparatus 100 may obtain an aesthetic score of 0.7 from the first window 203*a*, the second window 203*b* and the fourth window 203*d*, and obtain an aesthetic score of 0.3 from the sixth window 203*f*, and obtain an aesthetic score of 0.2 from the seventh window 203*f*.

The image processing apparatus 100 may analyze the proximity of the window (222).

The image processing apparatus 100 may determine how close each object is, that is, proximity, in order to merge one or more objects into one scene. The proximity is higher as the window is closer, and the proximity is analyzed according to the position of the window located in the first image 201 (215*a*).

Referring to FIG. 9, based on the position thereof, the first window 203*a* is closest to the second window 203*b*.

The image processing apparatus 100 merges the windows based on the obtained score and proximity (223).

The windows adjacent to each other are merged, but it is not necessarily to merge the windows based on the proximity. For example, when two windows have very different aesthetic scores which is the scores are out of a predetermined range, although the windows are adjacent to each other, merging is not performed (215*b*).

Referring to FIG. 9, because based on the position thereof, the first window 203a is closest to the second window 203b than the fourth window 203d, the first window 203a may be merged with the second window 203b except for the fourth window 203d.

The image processing apparatus 100 may perform optimal merging in consideration of the obtained score and proximity. The image 204 including the window on which the merging is performed is input again to the neural network.

The image processing apparatus 100 inputs the merged window into the neural network (224).

The neural network is the neural network of FIG. 6 that extracts features and performs regression analysis to obtain an aesthetic score. The neural network infers the aesthetic score again through the merged window.

The image processing apparatus 100 may compare the inferred score with a predetermined reference value (225).

When the inferred score is less than the predetermined reference value, the image processing apparatus 100 merges an other window based on the proximity and aesthetic scores of other windows and repeats the above-described process.

When the inferred score is equal to or greater than the predetermined reference value, the image processing apparatus 100 generates a region including the merged window as the second image (226).

On the other hand, when a predetermined number of mergings are attempted but the reference value is not exceeded, the image processing apparatus 100 may generate a merged window having the maximum aesthetic score inferred from the neural network as a second image by inputting the merged window.

Figure 10:
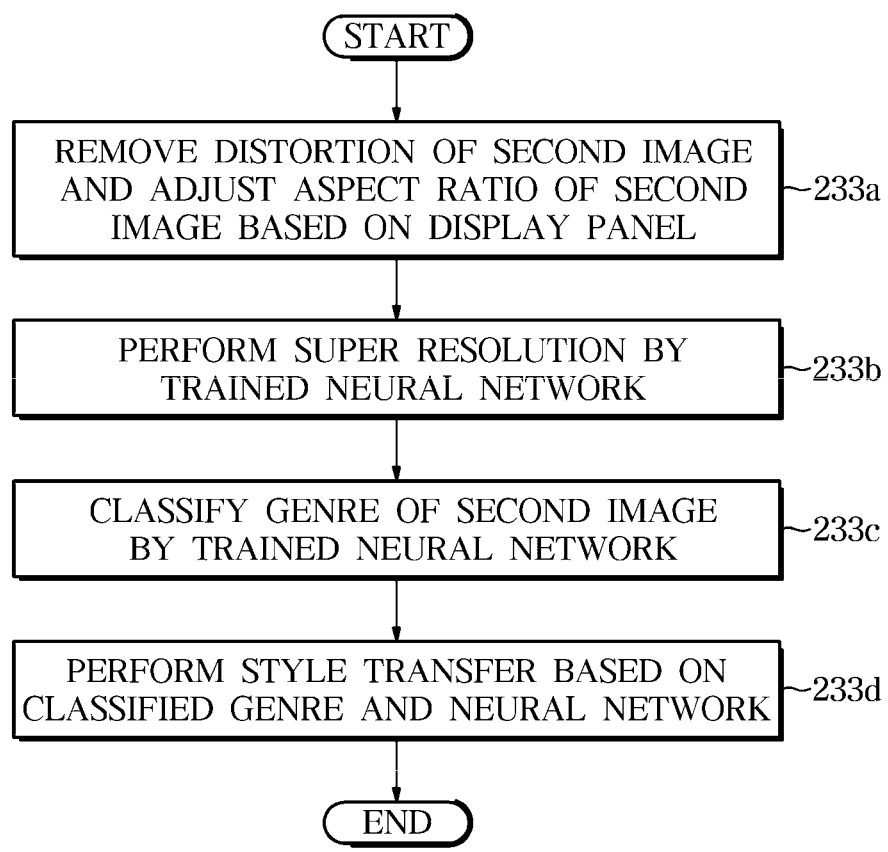
FIG. 10 is a flowchart illustrating example content-based image processing, according to an embodiment.
Figure 11:
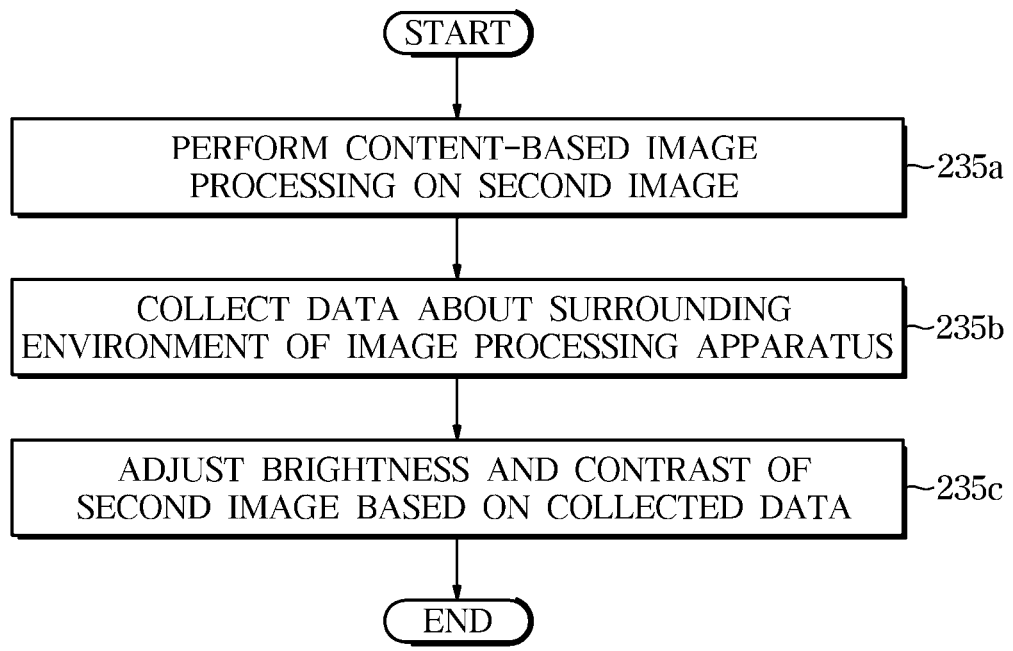
FIG. 11 is a flowchart illustrating example environment-based image processing, according to an embodiment.
Figure 12:
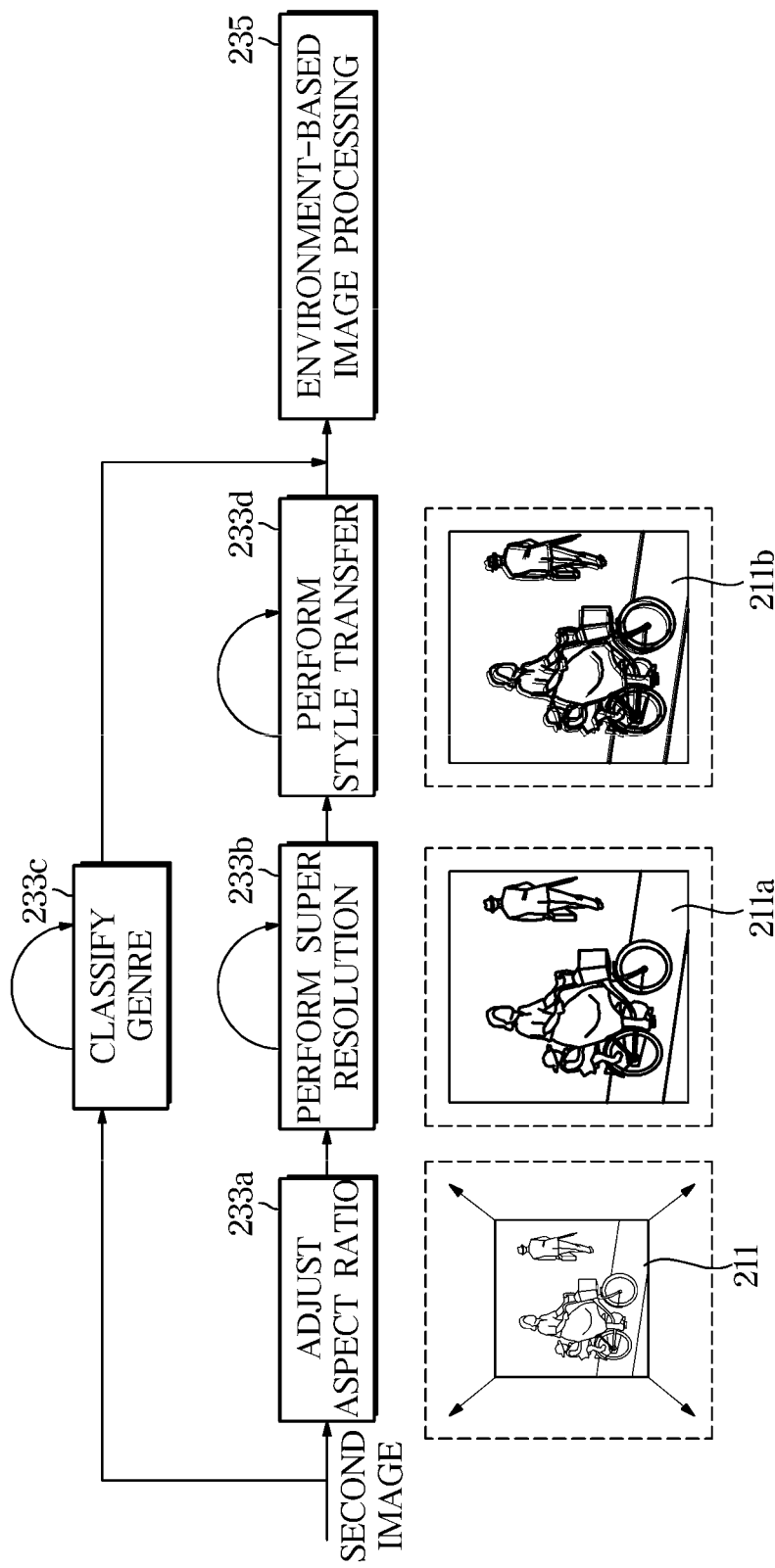
FIG. 12 is a diagram illustrating FIGS. 11 and 12, in greater detail according to an embodiment.

FIG. 10 is a flowchart illustrating example content-based image processing, FIG. 11 is a flowchart illustrating example environment-based image processing, and FIG. 12 is a diagram illustrating FIGS. 11 and 12, according to an embodiment.

Referring first to FIG. 10, the image processing apparatus 100 may remove distortion of the second image 211 and adjust the aspect ratio of the second image 211 based on the display panel (233a).

The second image 211 of FIG. 12 may represent an image obtained in such a way that the image 204 merged in FIG. 9 is input to the neural network, and after being merged with another window is repeated several times based on the score inferred, and an image having a score higher than or equal to the predetermined reference value is selected. Accordingly, the first image 203a, the second window 203b, and the fourth window 203d may be merged in the second image 211.

Referring again to FIG. 10, removing distortion of an image may include, for example, a method used for conventional general image processing. In addition, adjusting the aspect ratio may be determined by the hardware configuration of the display panel of the image processing apparatus 100 and may be stored in the storage 150 at the time of manufacture.

The image processing apparatus 100 performs super resolution by the trained neural network (233b).

The super resolution may refer, for example, to a task that the trained neural network recognizes an object in an image and adjusts the recognized object to the resolution of the trained image, thereby reinforcing the image sharply.

The second image 211 generated through localization may, for example, be a region of the first image. Therefore, when the second image 211 is enlarged to the size of the display panel, the resolution is reduced. The neural network pre-learns a high resolution image including an object similar to the object contained in the second image, and adjusts the resolution of the second image similarly to the resolution of the compared image.

When the super resolution is performed, the image processing apparatus 100 classifies the genre of the second image by the trained neural network (233c). The image processing apparatus 100 performs the style transfer based on the classified genre and neural network (233d).

The genre may be classified by inputting the second image into the neural network, and may include various genres such as, for example, and without limitation, portraits, landscapes, oil paintings, still life paintings, animations, or the like. The image processing apparatus 100 classifies the genre of the second image using the neural network trained to distinguish the genres.

The image processing apparatus 100 may perform the style transfer to change the genre of the second image inferred by the neural network. The style transfer may refer, for example, to performing image processing so that the user may recognize that the genre of the image is different from the genre before the transfer.

The style transfer may be performed through the neural network, and various style transfer techniques may be used.

On the other hand, because the above-described super resolution and style transfer are performed about the object or genre contained in the image, it may be referred to as content-based image processing. The image processing apparatus 100 may enhance the aesthetics of the second image by performing the environment-based image processing described later, in addition to the content-based image processing described above.

Referring to FIG. 11, the image processing apparatus 100 may perform the content-based image processing on the second image (235a).

As described above in FIG. 10, the content-based image processing may include, for example, general image postprocessing without using neural networks, and various image processing with neural networks.

The image processing apparatus 100 collects data about the surrounding environment of the image processing apparatus (235b).

The data of the surrounding environment may refer, for example, to an indoor or outdoor environment in which the image processing apparatus 100 is installed, and may include a state of a current time point at which an image is displayed.

The data of the surrounding environment may be collected by the sensor 130 installed in the image processing apparatus 100. For example, the surrounding environment data may include brightness of an indoor light.

The data of the surrounding environment is not necessarily collected based on the sensor installed in the image processing apparatus 100, but may be collected by requesting data about the surrounding environment to the outside through the communication circuitry 160.

The image processing apparatus 100 adjusts the brightness and the contrast of the second image based on the collected data (235c).

As an example, when the image processing apparatus 100 determines that the current indoor light is very bright, the image processing apparatus 100 may adjust the brightness and contrast of the second image, in which the content-based image processing has performed, to make the second image clear. Through this, the image processing apparatus 100 may give an image aesthetic appeal.

FIG. 11 illustrates performing the environment-based image processing on the content-based image-processed second image, but the sequence of the image processing is not limited thereto. For example, according to another embodiment, the content-based image processing may be performed after performing the environment-based image processing.

Referring to FIG. 12, the image processing apparatus performs distortion adjustment and aspect ratio adjustment on the second image 211 (233a).

For example, the mother and daughter who ride the bicycle in the first image 201 may obtain a high aesthetic score, and then may be localized and contained in the second image 211. Because the second image 211 is a region of the first image 201, the image processing apparatus 100 enlarges the second image 211 to fit the display panel size.

The image processing apparatus 100 performs the super resolution on the second image 211 in which the distortion is removed and the aspect ratio is adjusted (233b).

As mentioned above, the super resolution is performed by the trained neural network, the second image 211 may be converted into an image (211a) in which the resolution thereof is adjusted as shown in FIG. 12.

After performing the super resolution, when the second image 211 is generated, the image processing apparatus 100 may input the second image 211 to the neural network to classify the genres of the second image 211 (233c).

The neural network for classifying genres may be trained based on other training data different from that of the neural network for performing the super resolution and style transfer, and infers the genre of the second image 211 as an output.

As an example, the first image 201 may be a picture of a calendar and a plant. However, because the second image 211 is localized only with the mother and daughter riding the bicycle, and the gentleman, the neural network may classify the second image 211 as a portrait. The classified genre is used for the style transfer.

The image processing apparatus 100 may perform the style transfer using the neural network based on the classified genre (233d).

In addition to the neural network that classifies genres for the style transfer, the neural networks may learn oil paintings related to the mother and daughter riding the bicycle, and the gentleman. The image processing apparatus may perform the image processing on the image 211a, in which the resolution is adjusted, using the style transfer that the neural network learns, and thus the image 211a is transferred into an image 211b having an oil painting style.

The image processing apparatus 100 may perform the environment-based image processing on an image in which the content-based image processing is performed (235).

Figure 13:
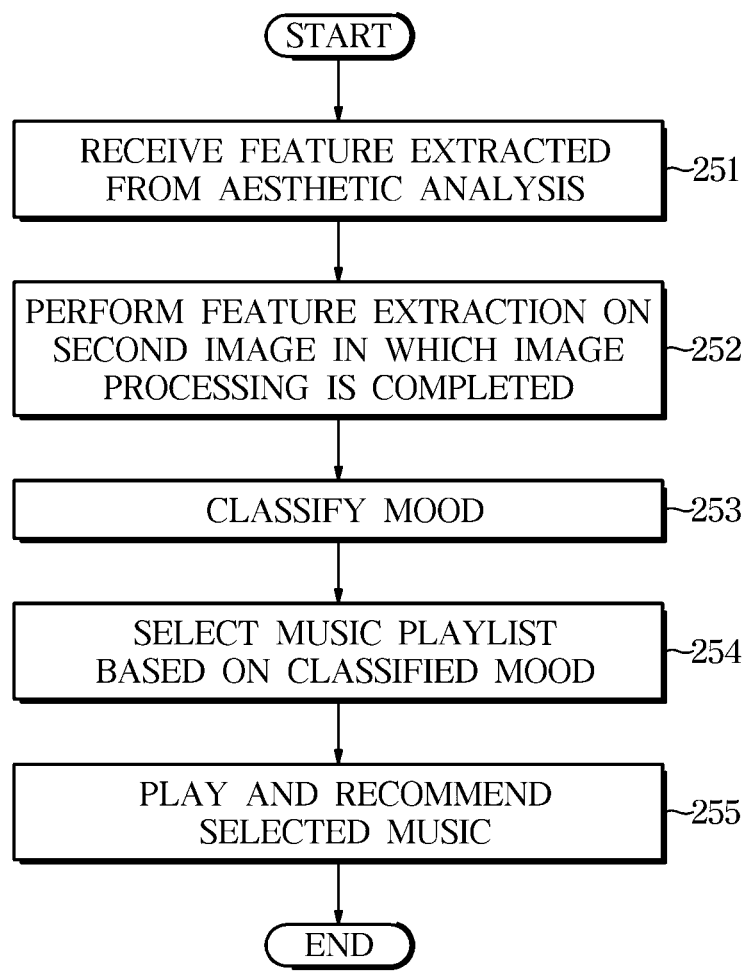
FIG. 13 is a flowchart illustrating an example method of recommending or reproducing music according to an embodiment.

FIG. 13 is a flowchart illustrating an example method of recommending or reproducing music according to an embodiment.

Figure 14:
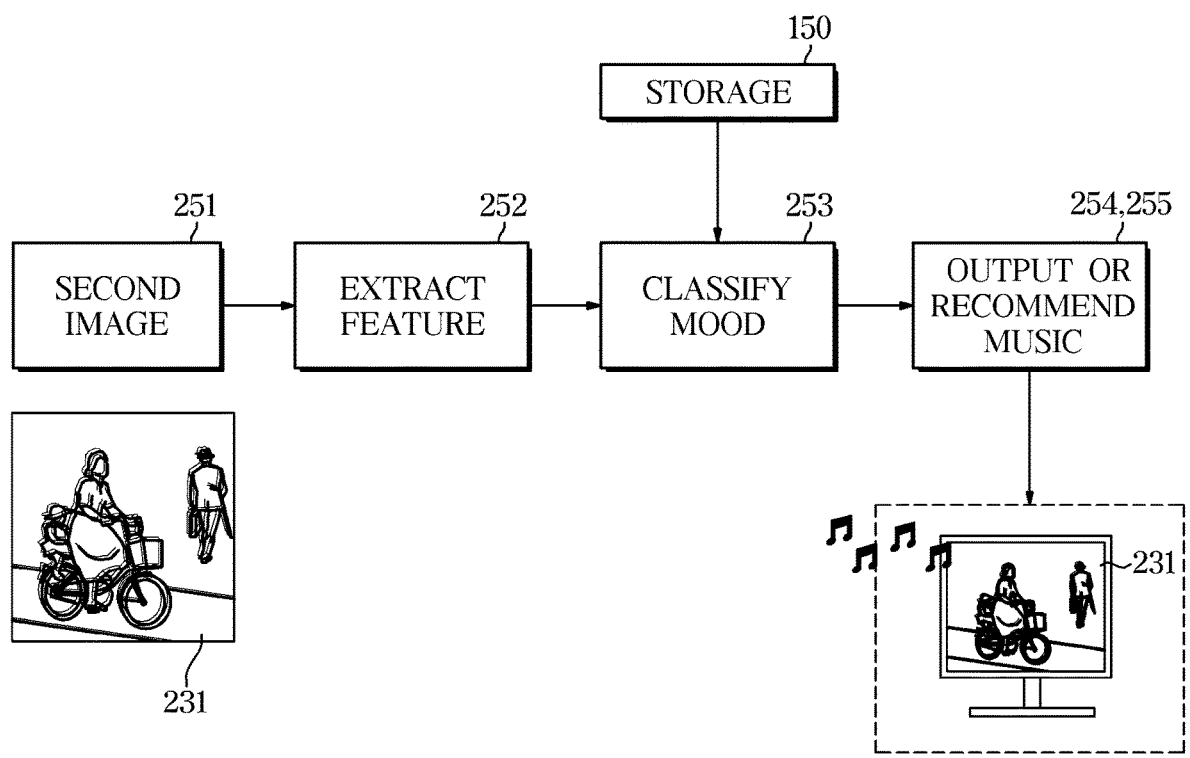
FIG. 14 is a diagram illustrating FIG. 13, in greater detail according to an embodiment.

Referring to FIG. 13, the image processing apparatus 100 may receive a feature extracted from the aesthetic analysis. FIG. 14 is a diagram illustrating FIG. 13 according to an embodiment.

The image processing apparatus 100 receives a feature extracted through the aesthetic analysis (251).

As described above in FIG. 6, the image processing apparatus 100 extracts a feature through the neural network to obtain an aesthetic score. The extracted feature is stored in the storage 150 and then used in the mood classification described below.

The image processing apparatus 100 performs feature extraction on the second image in which the image processing is completed (252).

The second image in which image processing is completed is an image in which both the content-based image processing and the environment-based image processing are performed, and represents a third image 231 of FIG. 14.

The image processing apparatus 100 inputs the third image 231 to the neural network and extracts features from the neural network. The neural network used herein corresponds to the neural network capable of extracting various features, as illustrated in FIG. 6.

When feature extraction is completed in the third image 231, the image processing apparatus 100 inputs the feature extracted from the third image 231 and the feature extracted from the first image stored in the storage 150 to the neural network.

The image processing apparatus 100 inputs a plurality of features to the neural network, and classifies the mood of the image based on the inferred result value (253).

The mood of the image classified in the neural network may include, for example, and without limitation, happiness, sadness, excitement, anger, calmness, or the like. In addition, the neural network may classify other moods than those described above.

On the other hand, it is not necessary to classify only the mood through the features extracted from the neural network. For example, the neural network may classify a theme or a production background of the third image 231 in addition to the mood, and classify a music playlist associated with the theme or the purpose of production.

When the mood is classified, the image processing apparatus may select a music playlist based on the classified mood (254).

The image processing apparatus 100 may load a playlist, which includes various sound sources classified according to the mood, from the storage 150 or the server 10. The image processing apparatus 100 selects a sound source according to the mood in the music playlist received from the server 10 or accessed from the storage 150.

The music playlist may include a plurality of sound sources, but the image processing apparatus 100 does not necessarily select a plurality of sound sources. For example, the image processing apparatus 100 may select a piece of music as a recommendation list.

The image processing apparatus 100 may recommend the selected music playlist to the user or output the sound source contained in the music playlist through the sound outputter 120.

The image processing apparatus 100 recommends or reproduces the music playlist and simultaneously outputs the third image 231 on the display 110.

Accordingly, the image processing apparatus 100 may improve performance of image processing and increasing accuracy of recommending music by performing aesthetic evaluation of individual objects contained in an image or by performing aesthetic evaluation through localization of an image in which objects are merged.

As is apparent from the above description, it is possible to improve performance of image processing and increase accuracy of recommending music by performing aesthetic evaluation of individual objects contained in an image or by performing aesthetic evaluation through localization of an image in which objects are merged.

Although various example embodiments of the present disclosure have been illustrated and described, it will be appreciated by those skilled in the art that changes may be made in these embodiments without departing from the principles and spirit of the present disclosure, the scope of which may be defined, for example, in the following claims and their equivalents.]

What is claimed is:

1. An image processing apparatus comprising:
communication circuitry;
a storage; and
at least one processor configured to control the image processing apparatus to: perform object recognition for recognizing a plurality of objects in first image data stored in the storage, obtain a first score through at least one neural network that is trained using data indicative of evaluation for aesthetics for each of the recognized plurality of objects, merge at least two objects among the plurality of objects based on the obtained first scores and a proximity of the plurality of objects, obtain a second score for the merged objects through the at least one neural network, generate a second image data using the merged objects in response to the second score being higher than a predetermined reference value, and perform image processing based on the second image data.

2. The image processing apparatus of claim 1, wherein the at least one processor is configured to control the image processing apparatus to: generate a window in the first image data, and perform the object recognition based on the generated window,
wherein the window is generated based on a predetermined number and size, or generated based on a size or an aspect ratio of the image data on which the object recognition is to be performed.

3. The image processing apparatus of claim 2, wherein the at least one processor is configured to control the image processing apparatus to: input the generated window to the at least one neural network, and select a window comprising each of the plurality of objects based on a reliability and a type of the object obtained from the at least one neural network.

4. The image processing apparatus of claim 3, wherein the score comprises an aesthetic score of an object contained in the selected window, and
the at least one processor is configured to control the image processing apparatus to: extract a feature from the at least one neural work and obtain the aesthetic score based on the extracted feature.

5. The image processing apparatus of claim 4, wherein the feature comprises at least one of color histogram features, text features, symmetry, rules of thirds features, or high level semantic features.

6. The image processing apparatus of claim 4, wherein the communication circuitry is configured to communicate with a server configured to perform operation processing through the at least one neural network,
wherein the at least one neural network is trained based on labeling contained in data crawling from the server.

7. The image processing apparatus of claim 4, wherein the at least one processor is configured to control the image processing apparatus to: determine the proximity based on a distance between the selected windows and merge the plurality of windows based on the obtained score and the proximity.

8. The image processing apparatus of claim 7, wherein the at least one is configured to control the image processing apparatus to: input the merged window into the at least one neural network, and compare the obtained second score with the predetermined reference value.

9. The image processing apparatus of claim 8, wherein based on the comparison result, the at least one processor is configured to control the image processing apparatus to generate the second image data comprising the merged window.

10. The image processing apparatus of claim 1, wherein the at least one processor is configured to control the image processing apparatus to perform image processing on the second image data to adjust a resolution based on the at least one neural network.

11. The image processing apparatus of claim 1, wherein the at least one processor is configured to control the image processing apparatus to: classify a genre of the second image data, and perform image processing to transfer the style of the second image data based on the classified genre.

12. The image processing apparatus of claim 1, further comprising:
a sensor configured to collect data about a surrounding environment of the image processing apparatus,
wherein the at least one processor is configured to control the image processing apparatus to perform image processing to adjust brightness or contrast of the second image based on the collected data.

13. The image processing apparatus of claim 4, wherein the at least one processor is configured to control the image processing apparatus to: store a first feature extracted from the at least one neural network based on the selected window, perform the neural network processing on the image processed second image, and extract a second feature from the at least one neural network.

14. The image processing apparatus of claim 13, wherein the at least one processor is configured to control the image processing apparatus to classify a mood of the second image.

15. The image processing apparatus of claim 14, further comprising:
a display configured to output the image processed second image data; and a sound outputter comprising sound output circuitry configured to reproduce a sound source,
wherein the at least one processor is configured to control the image processing apparatus to recommend a playlist based on the classified mood, control the sound outputter to output the sound source contained in the playlist, and control the display to output the image-processed second image data.

16. A method of controlling an image processing apparatus comprising:
performing object recognition for recognizing a plurality of objects in first image data;
obtaining a first score through at least one neural network that is trained using data indicative of evaluation for aesthetics for each of the recognized plurality of objects;
merging at least two objects among the plurality of objects based on the obtained first scores and a proximity of the plurality of objects,
obtaining a second score for the merged objects through the at least one neural network,
generating a second image data using the merged objects in response to the second score being higher than a predetermined reference value;
and
performing image processing on the second image data based on features extracted from the neural network.

17. The method of claim 16, wherein
the performing of the object recognition comprises:
generating a window in the first image data,
performing operation processing on the generated window through the neural network; and
selecting a window comprising each of the plurality of objects based on a reliability and a type of the object through the neural network processing.

18. The method of claim 16, wherein
the performing image processing on the second image comprises:
performing operation processing on the second image data through the neural network;
adjusting a resolution based on the result from the operation processing through the neural network;
classifying a genre of the second image; and
transferring a style of the second image data based on the classified genre.

19. The method of claim 17, further comprising:
storing a first feature extracted in the operation processing through the neural network based on the selected window;
performing the operation processing on the image processed second image data through the neural network;
re-performing the operation processing on the second feature and the first feature extracted from the neural network processing through the neural network; and
outputting a sound source based on a playlist received based on a mood of the second image data inferred in the operation processing.

20. A method of controlling an image processing apparatus comprising:
performing object recognition for recognizing a plurality of objects in first image data;
obtaining scores inferred through operation processing through a neural network for the recognized plurality of objects;
generating second image data based on at least the obtained score and a proximity of the plurality of objects; and
performing image processing on the second image data based on features extracted from the neural network;
wherein the performing of the object recognition comprises: generating a window in the first image data, performing operation processing on the generated window through the neural network; and selecting a window comprising each of the plurality of objects based on a reliability and a type of the object;
wherein the generating comprises: determining the proximity based on a distance between the selected windows; merging the plurality of windows based on the score and the proximity; performing operation processing on the merged window through the neural network; comparing the score with a predetermined reference value; and generating a second image comprising the merged window based on a result of the comparing.

* * * * *